United States Patent
Son et al.

(10) Patent No.: US 8,051,648 B2
(45) Date of Patent: Nov. 8, 2011

(54) EXHAUST MANIFOLD BEING INTEGRALLY FORMED WITH CYLINDER HEAD

(75) Inventors: Jin Wook Son, Gunpo (KR); Jin Kook Kong, Suwon (KR); Soung Jin Lee, Suwon (KR); Young Jin Won, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 250 days.

(21) Appl. No.: 12/274,153

(22) Filed: Nov. 19, 2008

(65) Prior Publication Data

US 2009/0241526 A1  Oct. 1, 2009

(30) Foreign Application Priority Data

Apr. 1, 2008 (KR) .................. 10-2008-0030492

(51) Int. Cl.
*F16D 39/00* (2006.01)
*B60T 11/28* (2006.01)
*F15B 7/08* (2006.01)
*F02F 1/10* (2006.01)
*F02F 1/42* (2006.01)
*F01P 1/06* (2006.01)
*F02B 15/00* (2006.01)

(52) U.S. Cl. ... 60/323; 60/589; 123/41.72; 123/41.82 R; 123/193.5; 123/41.31; 123/188.14; 123/432

(58) Field of Classification Search .......... 123/41.72, 123/41.82 R, 193.5, 41.31, 188.14, 432; 60/589
See application file for complete search history.

(56) References Cited

U.S. PATENT DOCUMENTS 5,092,126 A * 3/1992 Yano ............................. 60/602
5,095,704 A * 3/1992 Nagura et al. ................. 60/612

(Continued)

FOREIGN PATENT DOCUMENTS

JP   2005-188352 A   7/2005

(Continued)

OTHER PUBLICATIONS http://replay.waybackmachine.org/20071214075958/http://www.full-race.com/catalog/product_info.php?products_id=1246&osCsid=a2b19b422bf4133746b916e118483f79 , Dec. 14, 2007, p. 1-2.*

*Primary Examiner* — Thomas Denion
*Assistant Examiner* — Michael Carton
(74) *Attorney, Agent, or Firm* — Morgan, Lewis & Bockius LLP

(57) ABSTRACT

An engine includes exhaust manifold integrally formed with a cylinder head. The engine may include an exhaust manifold having at least one single exhaust outlet for exhausting exhaust gas that is exhausted from at least two cylinders that are not adjacent with each other, wherein periods during which exhaust valves are open are not overlapped with each other between the at least two cylinders.

The exhaust manifold is integrally formed with the cylinder head such that costs can be reduced. Also, the water jacket is formed between the exhaust passages of the exhaust manifold such that the durability of the turbocharger that is affected by a heat load can be improved.

Also, the twin scroll turbocharger is directly connected to the exhaust outlet of the manifold such that the compression ratio of the intake air can be effectively improved. Further, the exhaust passages at which pulsation interference occurs with each other are separately disposed and the exhaust passages at which pulsation interference does not occur are combined together to form a single passage such that the torque is improved at low rpm and the remaining gas is effectively scavenged.

10 Claims, 6 Drawing Sheets

U.S. PATENT DOCUMENTS

| | | |
|---|---|---|
| 6,941,755 B2 * | 9/2005 | Bucknell et al. .................. 60/602 |
| 2005/0086936 A1 | 4/2005 | Bucknell et al. |
| 2008/0134672 A1 * | 6/2008 | Willeke et al. ................... 60/323 |
| 2009/0126659 A1 * | 5/2009 | Lester et al. ................ 123/41.72 |

FOREIGN PATENT DOCUMENTS

| | | |
|---|---|---|
| JP | 2007-040275 A | 2/2007 |
| JP | 2008-038838 A | 2/2008 |
| KR | 1020080094379 | * 10/2008 |

* cited by examiner

Exhaust gas

EXHAUST MANIFOLD BEING INTEGRALLY FORMED WITH CYLINDER HEAD

CROSS-REFERENCE TO RELATED APPLICATION

The present application claims priority to Korean Patent Application No. 10-2008-0030492 filed Apr. 1, 2008, the entire contents of which application is incorporated herein for all purposes by this reference.

BACKGROUND OF THE INVENTION

1. Field of the Invention

The present invention relates to an engine that is equipped with an exhaust manifold being integrally formed with a cylinder head, and more particularly to an engine in which exhaust efficiency thereof is improved.

2. Description of Related Art

Generally, an exhaust manifold is developed as a separate component and is assembled to an engine, but it can affect the overall performance and durability of the engine.

The exhaust manifold not only needs a gap from surrounding components so that it does not heat them excessively, but it also requires space to house it in the engine compartment.

Also, a catalytic converter that is disposed downstream of the exhaust manifold needs to be installed close to the engine so as to be activated by the heat. Accordingly, the exhaust manifold and the engine need to be compact.

As the number of cylinders increases, as an example, there is a problem in that the low speed torque that is an important characteristic of the engine is decreased by exhaust pulsation resistance in an in-line four cylinder engine.

Figure 6:
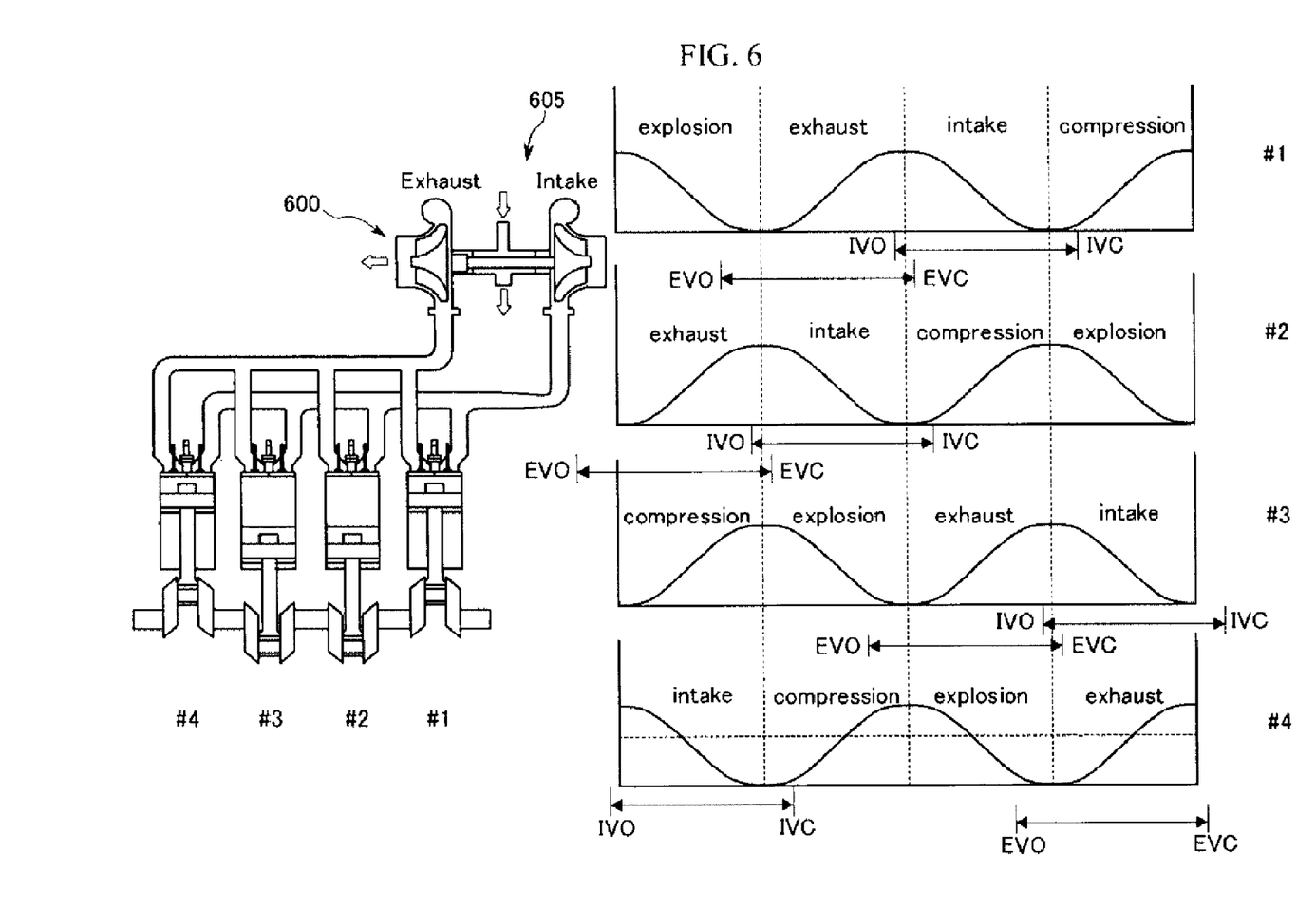
FIG. 6 is a schematic diagram and a table showing a conventional four cylinder engine and an exhaust stroke thereof.

FIG. 6 is a schematic diagram and a table showing a general four cylinder engine and an exhaust stroke thereof.

As shown in the left schematic diagram of FIG. 6, the engine includes a first cylinder #1, a second cylinder #2, a third cylinder #3, and a fourth cylinder #4. Also, an intake side and an exhaust side of respective cylinders are connected to a turbocharger 600 and 605.

As shown in the right table of FIG. 6, an expansion stroke is sequentially operated such as the first cylinder #1>the third cylinder #3>the fourth cylinder #4>the second cylinder #2. Accordingly, as shown in the table, one interval (EVO-EVC) in which an exhaust valve is open in the first cylinder #1 and another interval EVO-EVC in which an exhaust valve is open in the second cylinder #2 are overlapped.

Accordingly, the exhaust valve is open in the first cylinder #1 until the exhaust valve is closed in the second cylinder #2, and at this moment there is a problem in which remaining gas of the second cylinder #1 is not efficiently evacuated because of a high exhaust pressure of exhaust gas that is exhausted from the first cylinder #1.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

One aspect of the present invention is directed to and exhaust manifold integrally formed with a cylinder head, may include at least one single exhaust outlet joining passages of at least two cylinders and exhausting exhaust gas that is exhausted from the at least two cylinders that are not adjacent to each other, wherein open periods during which exhaust valves of the at least two cylinders are open are not overlapped with each other.

The passages may include a first exhaust passage connected to a first cylinder, the first exhaust passage through which exhaust gas exhausted from the first cylinder passes, and a fourth exhaust passage connected to a fourth cylinder that is not adjacent to the first cylinder, the fourth exhaust passage through which exhaust gas exhausted from the fourth cylinder passes, wherein the first exhaust passage and the fourth exhaust passage are joined together to form a first single exhaust outlet, and open periods of exhaust valves of the first cylinder and the fourth cylinder are not overlapped with each other.

The passages may include a second exhaust passage connected to a second cylinder, the second exhaust passage through which exhaust gas exhausted from the second cylinder passes, and a third exhaust passage connected to a third cylinder, the third exhaust passage through which exhaust gas exhausted from the third cylinder passes, and wherein open periods of exhaust valves of the second cylinder and the third cylinder are not overlapped with each other, and wherein the first cylinder, the second cylinder, the third cylinder, and the fourth cylinder are sequentially disposed, The second exhaust passage may have a second exhaust outlet and the third exhaust passage has a third exhaust outlet. The single exhaust outlet and the second and third exhaust outlets may form an exhaust assemblage portion.

A water jacket may be formed in the exhaust manifold, and is disposed to be adjacent to the first, second, third, and fourth exhaust passages. The water jacket may extend to a spare space formed between the first exhaust passage and the fourth exhaust passage and the water jacket may be adjacent to the second and third exhaust passages, the spare space displaced before the single exhaust outlet.

A twin scroll twin turbocharger may be installed on the exhaust assemblage portion. The twin turbocharger may include a first scroll and a second scroll that are co-axially coupled to a shaft, wherein the first scroll communicates with the single exhaust outlet and the second scroll communicates with the second or third exhaust outlet.

The second exhaust passage and the third exhaust passage may be joined together to form a second single exhaust outlet. The first single exhaust outlet and the second single exhaust outlet may form an exhaust assemblage portion. A twin scroll twin turbocharger may be installed on the exhaust assemblage portion wherein the twin turbocharger includes a first scroll and a second scroll that are co-axially coupled to a shaft, wherein the first scroll communicates with the first single exhaust outlet and the second scroll communicates with the second single exhaust outlet.

The exhaust manifold may be integrally formed with a cylinder head, and may further include second and third exhaust outlets for exhausting exhaust gas that is exhausted from two cylinders that are adjacent to each other are formed in the exhaust manifold.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
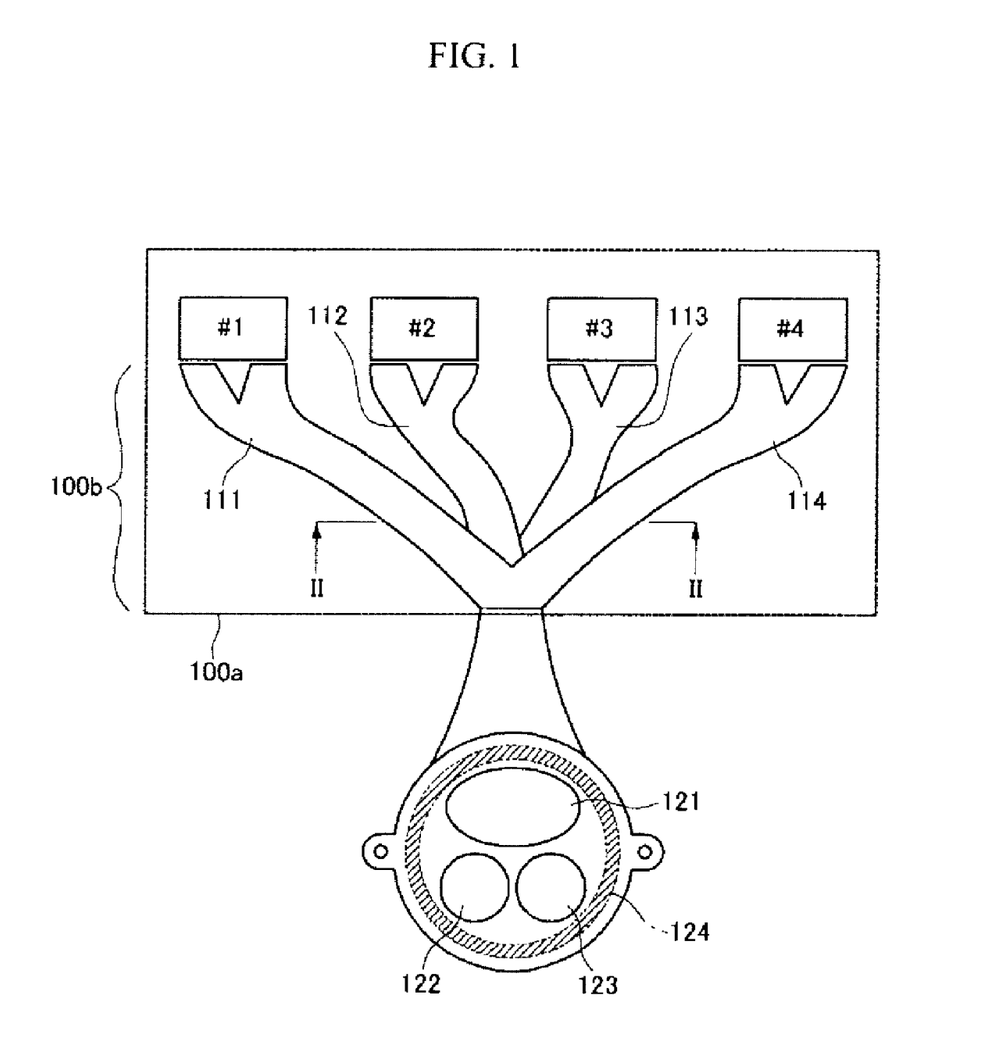
FIG. 1 is a schematic diagram of an exemplary engine having an exhaust manifold integrally formed with a cylinder head according to the present invention.
Figure 2:
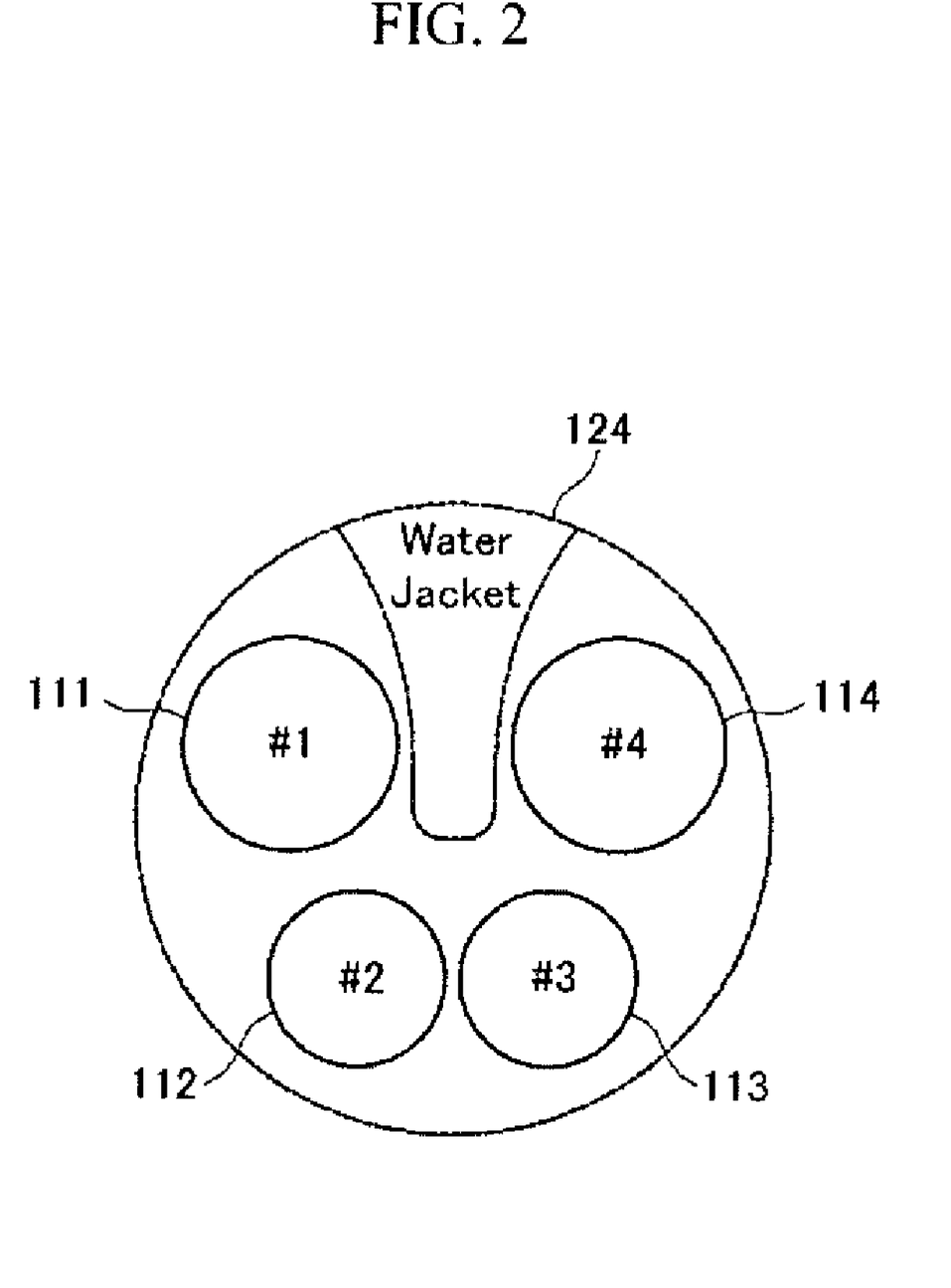
FIG. 2 is a cross-sectional view of the engine of FIG. 1 along a line II-II of FIG. 1.

FIG. 1 is a schematic diagram of an exemplary exhaust manifold being integrally formed with a cylinder head according to the present invention, and FIG. 2 is a cross-sectional view according to a line II-II of FIG. 1. One will appreciate that the exhaust manifold may be monolithically formed with the cylinder head.

As shown in FIG. 1, a first cylinder #1, a second cylinder #2, a third cylinder #3, and a fourth cylinder #4 are sequentially disposed in a cylinder head 100a.

Also, an exhaust manifold 100b is integrally formed with the cylinder head 100a, and a first exhaust passage 111, a second exhaust passage 112, a third exhaust passage 113, and a fourth exhaust passage 114 are formed in the manifold 100b. Again, one will appreciate that the exhaust manifold may be monolithically formed with the cylinder head.

As shown, the first exhaust passage 111 communicates with the first cylinder #1, and the second exhaust passage 11 2 communicates with the second cylinder #2. Also, the third exhaust passage 113 communicates with the third cylinder #3, and the fourth exhaust passage 114 communicates with the fourth cylinder #4.

As shown in a lower portion of FIG. 1, the first exhaust passage 111 and the fourth exhaust passage 114 are combined together in the middle portion of the second and third cylinder #2 and #3 to form a single exhaust outlet 121. A second exhaust outlet 122 and a third exhaust outlet 123 are sequentially disposed adjacent to a lower portion of the single exhaust outlet 121.

The single exhaust outlet 121, the second exhaust outlet 122, and the third exhaust outlet 123 constitute a single exhaust assemblage portion.

The second exhaust passage 112 is formed to communicate between the second exhaust outlet 122 and the second cylinder #2, and the third exhaust passage 113 is formed to communicate between the third exhaust outlet 123 and the third cylinder #3. Also, a water jacket 124 is formed around the first, second, third, and fourth exhaust passages 111, 112, 113, and 114 and the single exhaust outlet 121, second exhaust outlet 122, and third exhaust outlet 123 of the single exhaust assemblage portion.

The water jacket 124 is formed by interior coolant passages that are formed inside the manifold 100b that is integrally formed with the cylinder head 100a, and the coolant of the water jacket 124 cools the exhaust gas that passes through the first, second, third, and fourth exhaust passage 111, 112, 113, and 114, and the single exhaust outlet 121, second exhaust outlet 122, and third exhaust outlet 123 of the single exhaust assemblage portion.

FIG. 2 is a cross-sectional view according to a line II-II of FIG. 1.

As shown in FIG. 2, a spare space is formed in the manifold between the first exhaust passage 111 and the fourth exhaust passage 114 until the first exhaust passage 111 and the fourth exhaust passage 114 are combined together.

The water jacket 124 is formed in the spare space. In various embodiments of the present invention, the water jacket 124 may extend toward the center of the space enclosed by the first, second, third and fourth exhaust passages 111, 112, 113, and 114.

Accordingly the adjoining area between the first exhaust passage 111 and the fourth exhaust passage 114, and the water jacket 124, is increased, so the exhaust gas is effectively cooled and noise and vibration by pulsations of the exhaust gas are decreased.

In a like manner, an adjoining area between the second and third exhaust passage 112 and 113 and the water jacket 124 is also increased such that the temperature of the passing exhaust gas is effectively lowered and noise and vibration by pulsations of the exhaust gas are decreased.

In various embodiments of the present invention, when a turbocharger is connected to the single exhaust outlet 121, second exhaust outlet 122 and third exhaust outlet 123 of the single exhaust assemblage portion, pulsations are reduced and the temperature of the exhaust gas is lowered such that the durability and performance of the turbocharger can be improved.

Figure 3:
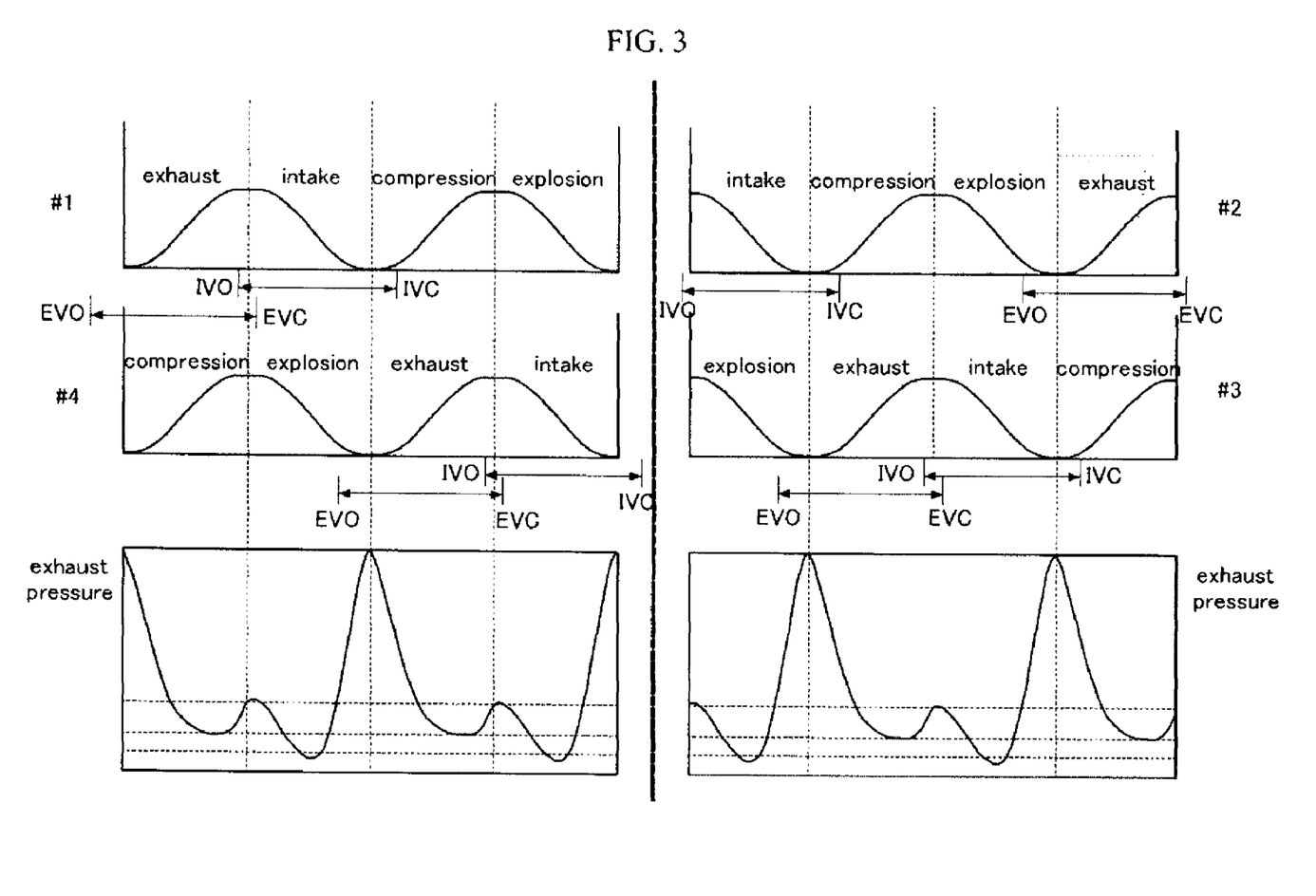
FIG. 3 is table showing exemplary exhaust strokes and exemplary exhaust pressures according to the present invention.

FIG. 3 is a table showing an exhaust stroke and exhaust pressure according to an exemplary embodiment of the present invention.

Referring to FIG. 3, the first cylinder #1 sequentially performs exhaust, intake, compression, and expansion strokes, and the fourth cylinder #4 sequentially performs compression, expansion, exhaust, and intake strokes in accordance with the first cylinder #1.

Also, the second cylinder #2 sequentially performs intake, compression, expansion, and exhaust strokes in accordance with the first cylinder #1, and the third cylinder #3 sequentially performs expansion, exhaust, intake, and compression strokes in accordance with the first cylinder #1.

As shown in the first cylinder #1 and the fourth cylinder #4, when the first cylinder #1 is in an exhaust interval (EVO-EVC) the fourth cylinder #4 is in a compression stroke, and when the first cylinder #1 is in an intake stroke the fourth cylinder #4 is in an expansion stroke.

More specifically, when the first cylinder #1 is in the intake stroke, the fourth cylinder #4 is in the expansion stroke, the exhaust valve is open at a last portion of the expansion stroke. Accordingly, there is no overlap period in which the exhaust valves of the first cylinder #1 and the fourth cylinder #4 are simultaneously open.

As shown in FIG. 1 according to an exemplary embodiment of the present invention, the exhaust passages 111 and 114 of the first and fourth cylinders #1 and #4 are combined together to form a single exhaust outlet 121, and the respective valves are not overlapped such that the remaining gas in the first and fourth cylinder #14 is reduced.

Also, the exhaust gas of the first and fourth cylinders #1 and #4 do not interfere with each other such that torque is not reduced at low/medium RPM. Particularly, in a case in which the engine is operated under a high load at low RPM and the intake pressure is uniform, as the exhaust pressure becomes lower, the scavenging effectiveness of the remaining gas is increased.

Meanwhile, the second cylinder #2 and the third cylinder #3 respectively use the exhaust passages 112 and 113, so exhaust interference hardly occurs therewith. However, in various embodiments of the present invention, the second and third exhaust passage 112 and 113 that communicate with the second and third cylinders #2 and #3 may be combined together to form a single exhaust outlet.

As shown in FIG. 3, since the periods in which the exhaust valves are open are not overlapped, overall exhaust pressure is distributed and a high point of the exhaust pressure is lowered such that the exhaust pulsation is reduced.

Figure 4:
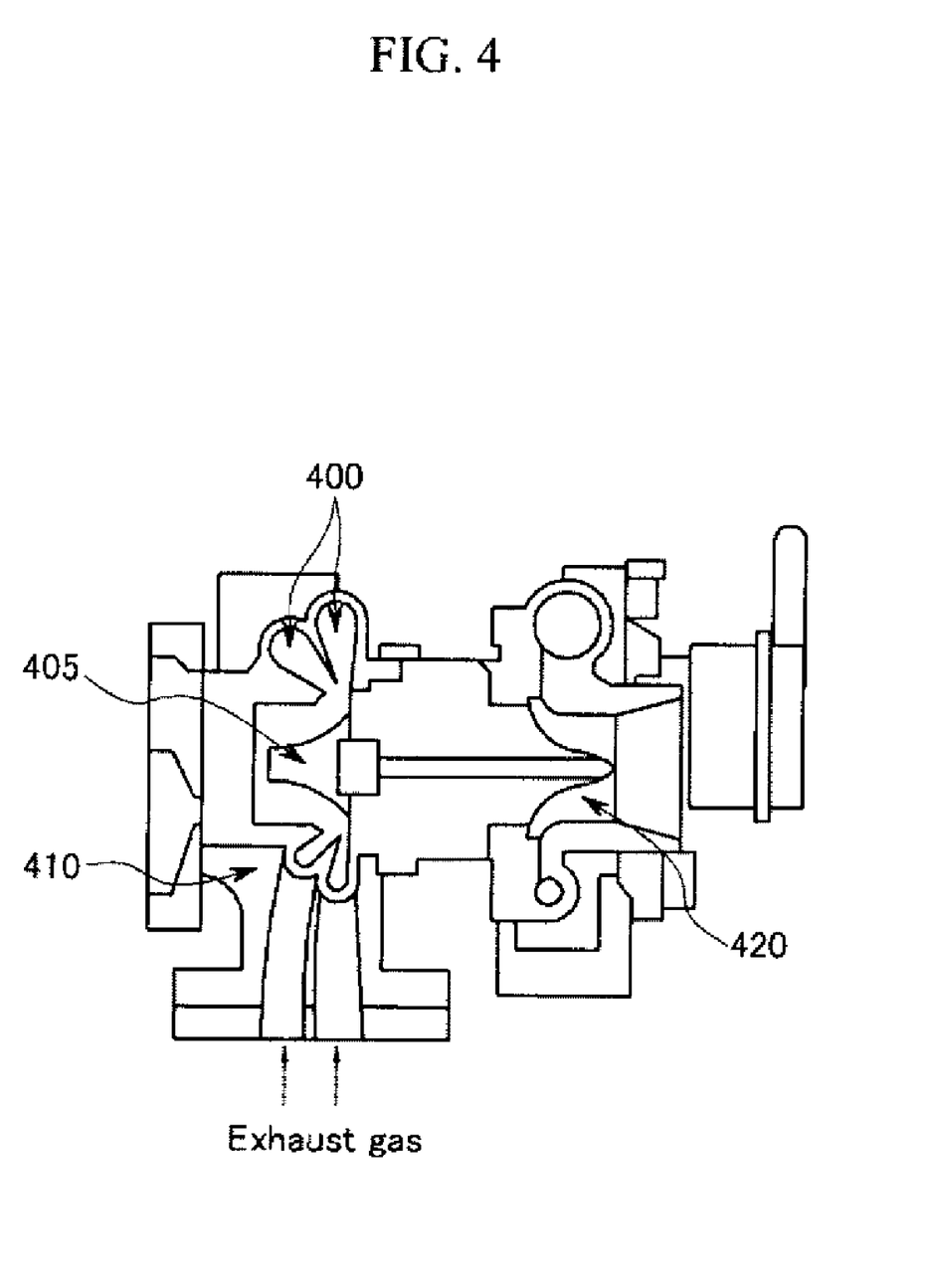
FIG. 4 is a cross-sectional view of an exemplary twin scroll turbocharger disposed in an exhaust side according to the present invention.

FIG. 4 is a cross-sectional view of a twin scroll turbocharger that is disposed in an exhaust side according to an exemplary embodiment of the present invention.

Referring to FIG. 4, a twin scroll turbocharger includes a twin scroll 400 that includes a first scroll and a second scroll, a turbine wheel 405, a turbine housing 410, and a compressor wheel 420, and the twin scroll 400 is rotated by the exhaust gas and thereby the compressor wheel 420 charges the intake air into the cylinders of the engine.

Referring to FIG. 1 and FIG. 4, the first scroll can be connected to the single exhaust outlet 121 and the second scroll can be connected to the second and third exhaust passages 122 and 123. As stated above, exhaust pulsation energy of the exhaust gas is transferred to the intake air such that exhaust efficiency and intake efficiency are improved.

In various embodiments in which the second and third exhaust passage 112 and 113 that communicate with the second and third cylinders #2 and #3 are combined together to form a single exhaust outlet as stated above, the first scroll can be connected to the single exhaust outlet 121 connected to the first and fourth exhaust passage 111 and 114 and the second scroll can be connected to the single exhaust outlet connected to the second and third exhaust passages 122 and 123.

In a general single turbocharger, when an exhaust stroke of the first cylinder is being completed, an exhaust stroke of the third cylinder is started and the exhaust strokes are overlapped such that the pressure of the exhaust side is increased and the exhaust efficiency is deteriorated.

However, the twin scroll turbocharger may be used in order not to increase the exhaust pressure of other cylinders by the exhaust pulsation during the exhaust stroke in various embodiments.

Figure 5:
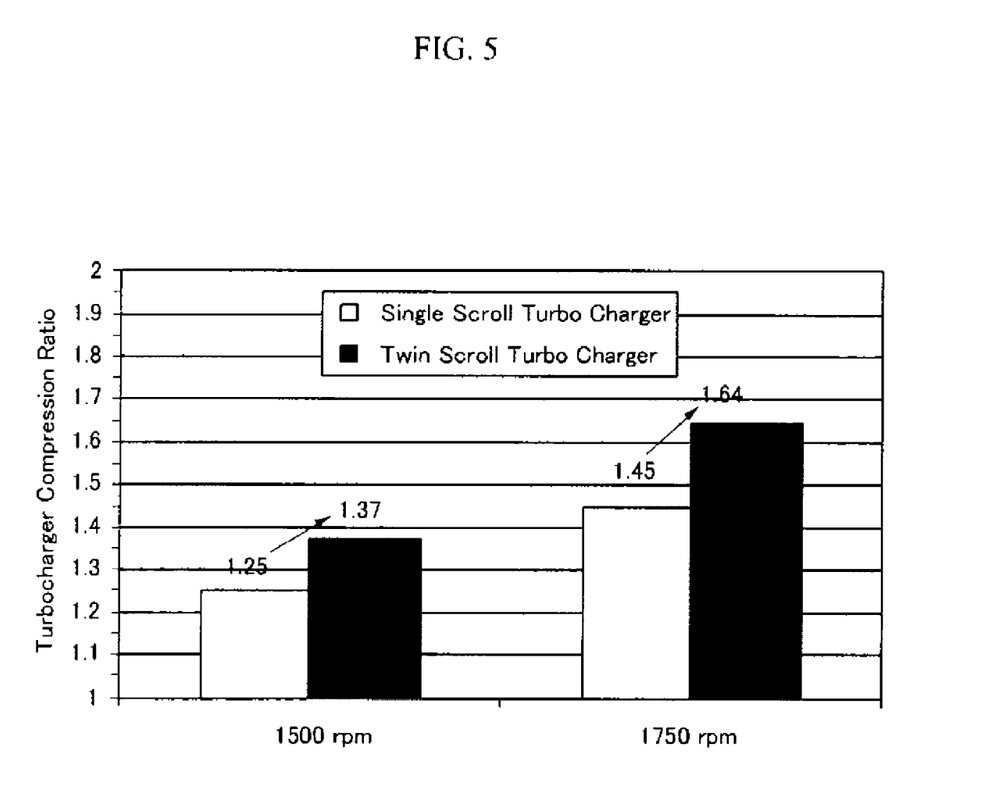
FIG. 5 is a table showing effectiveness of a twin scroll turbocharger according to an exemplary embodiment of the present invention.

FIG. 5 is a table showing effectiveness of a twin scroll turbocharger according to an exemplary embodiment of the present invention.

As shown in FIG. 5, when a single turbocharger and a twin turbocharger are compared, the compression ratio of the single turbocharger is 1.25 and the compression ratio of the twin turbocharger is 1.37 at 1500 rpm.

Also, the compression ratio of the single turbocharger is 1.45 and the compression ratio of the twin turbocharger is 1.64 at 1750 rpm.

As described above, the twin turbocharger uses the exhaust gas pulsation energy that is generated when the exhaust valve is opened more effectively than the single turbocharger such that the compression ratio of the intake air is improved. Accordingly, the output and the combustion efficiency of the engine are improved.

For convenience in explanation and accurate definition in the appended claims, the terms "lower", "inside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. An exhaust manifold being integrally formed with a cylinder head, comprising:
    single exhaust outlet joining passages of at least two cylinders and exhausting exhaust gas that is exhausted from the at least two cylinders that are not adjacent to each other,
    wherein open periods during which exhaust valves of the at least two cylinders are open are not overlapped with each other
    wherein the passages include:
        a first exhaust passage connected to a first cylinder, the first exhaust passage through which exhaust gas exhausted from the first cylinder passes;
        a fourth exhaust passage connected to a fourth cylinder that is not adjacent to the first cylinder, the fourth exhaust passage through which exhaust gas exhausted from the fourth cylinder passes, wherein the first exhaust passage and the fourth exhaust passage are joined together to form a single exhaust outlet, and open periods of exhaust valves of the first cylinder and the fourth cylinder are not overlapped with each other;
        a second exhaust passage connected to a second cylinder, the second exhaust passage through which exhaust gas exhausted from the second cylinder passes; and
        a third exhaust passage connected to a third cylinder, the third exhaust passage through which exhaust gas exhausted from the third cylinder passes, wherein open periods of exhaust valves of the second cylinder and the third cylinder are not overlapped with each other;
    wherein the first cylinder, the second cylinder, the third cylinder, and the fourth cylinder are sequentially disposed;
    wherein the second exhaust passage has a second exhaust outlet and the third exhaust passage has a third exhaust outlet;
    wherein the single exhaust outlet and the second and third exhaust outlets form an exhaust assemblage portion;
    wherein a water jacket is formed in the exhaust manifold, and is disposed to be adjacent to the first, second, third, and fourth exhaust passages; and
    wherein the water jacket extends to a spare space formed between the first exhaust passage and the fourth exhaust passage and the water jacket is adjacent to the second and third exhaust passages, the spare space displaced before the single exhaust outlet.

2. The exhaust manifold of claim 1, wherein a twin scroll twin turbocharger is installed on the exhaust assemblage portion.

3. The exhaust manifold of claim 2, wherein the twin turbocharger includes:
a first scroll and a second scroll that are co-axially coupled to a shaft,
wherein the first scroll communicates with the single exhaust outlet and the second scroll communicates with the second or third exhaust outlet.

4. The exhaust manifold of claim 1, wherein the second exhaust passage and the third exhaust passage are joined together to form a second single exhaust outlet.

5. The exhaust manifold of claim 4, wherein the first single exhaust outlet and the second single exhaust outlet form an exhaust assemblage portion.

6. The exhaust manifold of claim 5, wherein a twin scroll twin turbocharger is installed on the exhaust assemblage portion.

7. The exhaust manifold of claim 6, wherein the twin turbocharger includes:
a first scroll and a second scroll that are co-axially coupled to a shaft,
wherein the first scroll communicates with the first single exhaust outlet and the second scroll communicates with the second single exhaust outlet.

8. The exhaust manifold of claim 1, wherein second and third exhaust outlets for exhausting exhaust gas that is exhausted from two cylinders that are adjacent to each other are formed in the exhaust manifold.

9. An engine comprising the exhaust manifold of claim 1.

10. A passenger vehicle comprising the engine of claim 9.

* * * * *